Patented Aug. 8, 1933

1,921,585

UNITED STATES PATENT OFFICE 1,921,585

FOOD DRESSING AND THE LIKE

William A. Rooker and Victor E. Speas, Kansas City, Mo., assignors to Speas Mfg. Co., Kansas City, Mo., a Corporation of Missouri No Drawing. Application August 14, 1929
Serial No. 385,960

9 Claims. (Cl. 99—11)

The present invention relates to food products and more particularly to products of the salad dressing type that contains tomato or other vegetable particles, as well as the usual oil, egg, sugar, salt, vinegar and spices. Products of this nature, under the terms, "Thousand Island dressing" or "Sandwich spread" are being manufactured and sold by many companies and we do not claim invention of such products. We have invented, however, a new and highly advantageous process of preparing products of this class.

At the present time, so-called "Thousand Island dressings" and "Sandwich spreads" are prepared by a general procedure that simply consists of adding to regular mayonnaise dressing, the desired amounts of chili sauce, mixed pickle, chopped pimento or other vegetable particles.

For example, a mayonnaise dressing is prepared by the manufacturer's usual formula. The following is a typical commercial mayonnaise recipe:

| | Pounds |
|---|---|
| Edible oil | 78 |
| Egg yolks | 8 |
| Vinegar | 10 |
| Sugar, salt and spices | 4 |

The procedure of combining the ingredients varies slightly, but the usual or standard procedure is to emulsify the egg and oil by slowly adding the oil to the egg while agitating or whipping the mass. The sugar, salt and spices are added to the emulsified egg and oil and the vinegar is added to the emulsion after it is finished or while it is being formed. The resulting product is a mayonnaise dressing and to it are added the ingredients required to convert it into a Thousand Island dressing or sandwich spread.

To manufacture a "Thousand Island dressing" from the batch of mayonnaise given above, the following weights of other ingredients are typical of average practice.

| | Pounds |
|---|---|
| Chili sauce | 18 |
| Chopped and drained mixed pickle | 18 |
| Chopped pimentos | 3 |

The mixed pickles and the pimentos are usually chopped fine and drained or pressed free of excess brine or moisture. After adding the vegetable ingredients to the mayonnaise, the mass is agitated sufficiently to insure a uniform mixture and the product is then packed in the containers.

Thousand Island dressings and sandwich spreads are wholesome, delectable foods and are as popular with the public as is mayonnaise or other dressings, but from the manufacturer's viewpoint, they are not considered desirable products to pack. It is a well recognized fact that even the most carefully prepared mayonnaise does not have perfect keeping qualities. In time, the emulsion separates and this separation may be brought about very quickly by subjecting the product to extremes of heat or cold. Incidentally, such so-called extremes are not drastic variations from the average temperatures, but may be only those variations that occur in the average grocery store during a cold winter or unusually warm summer.

Mayonnaise, however, has far better keeping qualities than either a Thousand Island dressing or a sandwich spread. These latter products are usually manufactured by local firms who are in a position to keep in close touch with their distributors and pick up or take back any package of their product at the first signs of separation or spoilage. This practice, however, is very expensive and annoying and is, of course, more so to firms with nation-wide or large territory distribution. We have, however, invented a process of preparing products of this nature in such a manner that their keeping qualities will be equal to, if not superior to that of the best mayonnaise. From the foregoing, the advantages of such a method are self-evident.

We have found the pronounced tendency of such products to separate to be due to the facts that, first, the vegetable ingredients added to the mayonnaise are simply mixed in and are, therefore, not an integral part of the emulsion and, second, it is impossible to have these ingredients moisture-free and as a result, some seepage of moisture will always take place. This moisture then acts as a nucleus around which the moisture of the emulsion-proper gathers. Once this action starts, the emulsion cracks or breaks down rapidly, thus accounting for the marked difference between the keeping qualities of a mayonnaise dressing and the Thousand Island dressing or sandwich spread prepared from it.

To counteract the above mentioned deteriorating action, we have invented a process of preparing Thousand Island dressing, sandwich spread and similar products, that is characterized, first, by incorporating certain of the vegetable ingredients into the actual emulsion and, second, by adding certain colloid substances to the remaining ingredients for the purpose of keeping the moisture of said ingredients from having a deteriorating action on the emulsion. The said colloid substances are finely powdered casein, egg albumin, gelatine, agar agar, pectin, gum arabic, gum acacia, gum tragacanth, or other similar or equivalent substances.

The following is an example of our process when applied to the manufacture of a Thousand Island dressing and it will be seen that variations may be made without circumventing or evading the spirit of our invention. For the sake of clarity and simplicity, we have applied the example of our invention to the ingredients previously listed.

Recipe:                                              Pounds
    Edible oil_____ 78
    Egg yolk_____ 8
    Vinegar_____ 10
    Chili sauce_____ 18
    Mixed pickles_____ 18
    Pimentos_____ 3
    Colloid substances_____ 2
    Sugar, salt and spices_____ 4

*Procedure*

1. One fourth (8 oz.) of the colloid substance is added to the chili sauce or catsup or tomato pulp, if these latter ingredients are used in place of chili sauce and, after thoroughly mixing, the mass is heated sufficiently to dissolve the colloid substance.

2. The egg yolks are placed in the emulsifier and the tomato-product colloid-substance mixture is then slowly added to the egg yolk while agitating the mass. A very firm and stable emulsion results and to this emulsion, the oil is added. While adding the oil, the agitation is continued and a second emulsion is formed. This emulsion, however, is not simply the oil and egg emulsion obtained in the manufacture of a mayonnaise, for this emulsion contains the chili sauce or other tomato product as an integral constituent. We have found that the addition of part of the colloid substance to the chili sauce or other tomato material, gives to such material, emulsifying properties. This is very important, for the addition of 18 pounds of chili sauce to 8 pounds of egg may dilute the egg to such an extent that the emulsion resulting when the two are agitated together, may not have sufficient strength to carry the 78 pounds of oil into a firm, stable emulsion.

It is not our intention for the spirit of our invention to be limited to the exact recipe and weights of ingredients given in the above example.

To the emulsified egg, tomato product and oil, we add the vinegar in the usual manner. We mix the remainder (1½ pounds) of colloid substance with the sugar, salt and spices. To the drained or pressed pickle, pimento or other vegetable particles, we add this colloid substance, sugar, salt and spice mixture. The mass is thoroughly mixed so that the vegetable particles are well coated. The moisture adhering to the particles is sufficient to form a closely adhering coating of the colloid substance.

This mixture is then added to the emulsion and after mixing thoroughly, the product is ready to be packed in the containers. As the product stands or ages, the moisture seepage from the vegetable particles will simply cause th colloid substance to swell or paste. The moisture thus absorbed cannot act as a nucleus for the water in the emulsion.

While we have herein disclosed an illustrative embodiment of the invention and process for producing the same, it is to be understood that the invention is not limited thereto but comprehends other compositions and process steps as do not depart from the spirit of the invention.

Having thus disclosed the invention,
We claim:

1. A food dressing consisting of an emulsified mass of oil, egg yolk, and a vegetable sauce possessing artificially-imparted emulsifying characteristics, mixed with vegetable particles which are coated with a seasoning mixture including a colloid.

2. A food dressing composed of an emulsified mass of an edible oil, egg yolk and a sauce, and vegetable particles which are coated with a seasoning mixture including a colloid.

3. The process of making a food dressing comprising first emulsifying a colloid, a sauce and egg yolk, then emulsifying an oil with said emulsion, and then adding to the finally obtained emulsion a mass of vegetable particles which have been previously coated with a seasoning mixture including a colloid.

4. The process of making a food dressing comprising producing an emulsion including a sauce, egg yolk and oil, and then adding to said emulsion a mass of vegetable particles which have been previously coated with a seasoning mixture including a colloid.

5. The process of making a food dressing comprising first emulsifying a colloid, a sauce, egg yolk and oil, and then adding to the emulsion a mass of vegetable particles which have been previously intimately mixed with seasoning ingredients and a colloid.

6. The process of making a food dressing comprising mixing a colloid substance with a sauce and heating the mixture, emulsifying the heated mixture with egg yolk, emulsifying the last mentioned emulsified mixture with an oil, and incorporating with the finally obtained emulsion a mass of vegetable particles which have been previously coated with a seasoning mixture including a colloid.

7. The process of making a food dressing comprising forming an emulsion of a colloid substance, a sauce, egg yolk and oil, separately mixing vegetable particles with a seasoning mixture including a colloid, and finally forming a stable and coherent mass by incorporating the colloidally coated vegetable particles with said emulsion.

8. The process of making a food dressing comprising artificially imparting emulsifying characteristics to a sauce by means of a colloid, emulsifying the colloidally-treated sauce with a mass of egg yolk and oil, and mixing with the emulsion vegetable particles which have been previously coated with a seasoning mixture including a colloid.

9. The process of making a food dressing comprising artificially imparting emulsifying characteristics to a vegetable sauce by mixing a colloid substance therewith, emulsifying the colloid-sauce mixture with egg yolk, then emulsifying oil with the emulsion thus obtained, and adding to the final emulsion a mass of vegetable particles which have been previously intimately mixed with a seasoning mixture including a colloid.

WILLIAM A. ROOKER.
VICTOR E. SPEAS.